J. M. PARKER.

Assignor to LOOM-PICKER COMPANY.

Loom-Picker.

No. 8,191. Reissued April 23, 1878.

Witnesses.
S. N. Piper.
L. A. Miller

Inventor
Jerome M. Parker.
by R. H. Eddy atty.

N. PETERS, PHOTO-LITHOGRAPHER, WASHINGTON, D. C.

UNITED STATES PATENT OFFICE.

JEROME M. PARKER, OF LEICESTER, MASSACHUSETTS, ASSIGNOR TO LOOM PICKER COMPANY.

IMPROVEMENT IN LOOM-PICKERS.

Specification forming part of Letters Patent No. 111,378, dated January 31, 1871; Reissue No. 8,191, dated April 23, 1878; application filed November 28, 1877.

*To all whom it may concern:*

Be it known that I, JEROME M. PARKER, now or late of Leicester, of the county of Worcester, of the State of Massachusetts, have invented a new and useful Improvement in Loom-Pickers Constructed of Rawhide; and do hereby declare the same to be described in the following specification, and represented in Figures 1 and 2 of the accompanying drawings.

Figure 1:
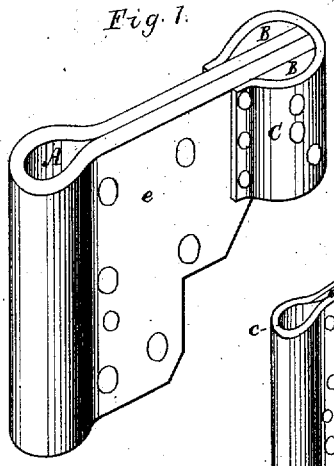
Figure 2:
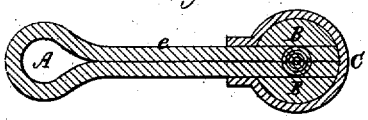

Fig. 1 is a perspective view, and Fig. 2 a longitudinal section, of a picker embracing my invention.

Figure 3:
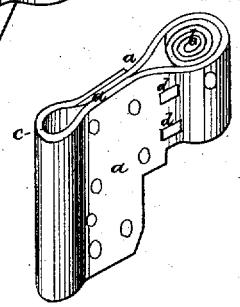

Fig. 3 is a view, in perspective, of a rawhide picker, as commonly made prior to my said invention, it being therein shown as composed of two strips or sheets of the hide, that marked *a* being bent in manner and lapped upon itself as represented, and also made to partially encompass the other, (marked *b*,) which is bent in a close spiral or scroll, and constitutes the part of the picker which, when such picker is in use, is driven into contact with the nose of the shuttle. Where the end portions of the piece *a* overlap each other, they are usually chamfered, to render the picker-shank essentially of a uniform thickness.

The piece *a*, bent in tubular form, as shown at *c*, to encompass and slide upon a guide-rod applied to the loom, is also bent to form a socket to receive the rawhide scroll or plug *b*, the parts being secured together by rivets passed through them.

While such a picker is in operation its rivets, especially those marked *d d*, at the junction of the shank and head, are liable to become broken, and, besides, the picker is also liable to there become ruptured or broken away from the rivets, all of which, if not productive of accident or damage to the loom, or the warp, or to the cloth while being woven, usually renders the picker practically inoperative or useless for the purpose for which it is intended.

In carrying out my invention or improvement, in manner as exhibited by Figs. 1 and 2, the body *e* of the picker, formed of one sheet of material, and bent as represented in such figures, is extended within and nearly across the head, which, formed as shown, consists of a separate sheet, C, the part of the body within it, and a filling or segments or pieces, B B, of rawhide, all being arranged as set forth, and connected by rivets going through the several parts.

By the said construction, it will be seen that, by the body portion being extended within, and so as to make part of, the head, the picker is rendered stronger and more durable, or better capable of resisting the impacts of the shuttle; for, when the body goes into and partly across the head and makes part thereof, the shuttle-nose, when the picker is driven against the shuttle, or the shuttle against the picker, will be met or resisted by the body part or portions within the head, and as such part or portions are in one piece with the rest of the body, the picker is much more durable than one wherein the body at the head is looped around a plug of rawhide and with such forms the head.

I claim—

1. A rawhide picker constructed with its body extended within and nearly across the head, and secured thereto by rivets passing through both, as set forth.

2. The combination of the looped head-piece C and a filling or segments, B B, with the body *e* extended within and nearly across and making part of the head, such piece C and body being connected, as described.

JEROME M. PARKER.

Witnesses:
T. E. HOPKINS,
J. G. GARLAND.